Jan. 25, 1966    C. A. IRAZOQUI    3,230,644
ELECTRONIC BRAILLE INSTRUCTOR
Filed June 29, 1961    3 Sheets-Sheet 1
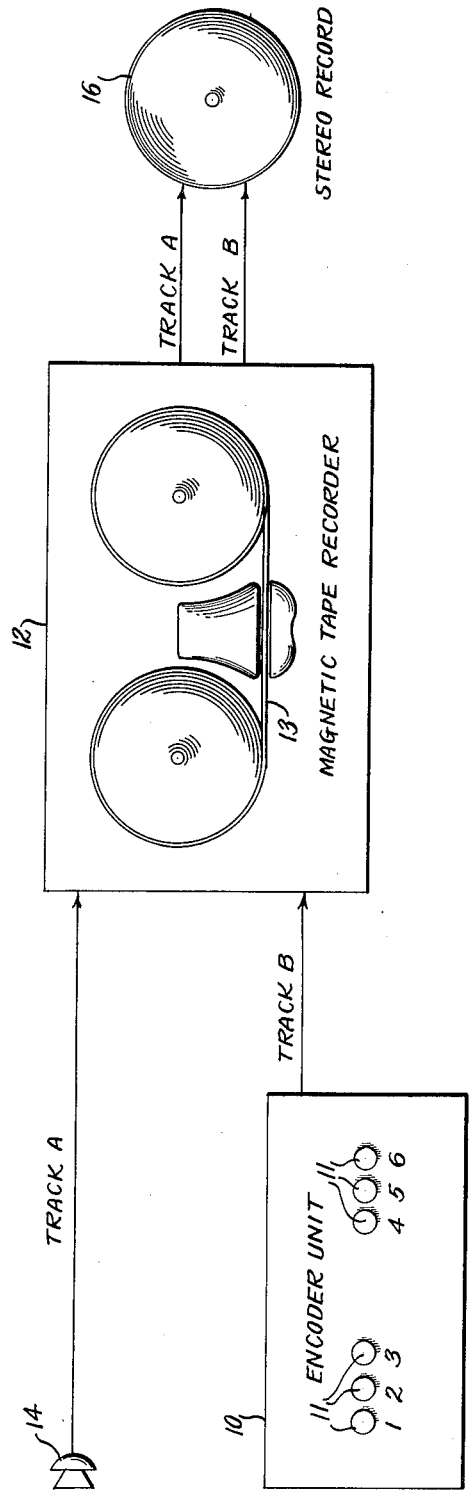
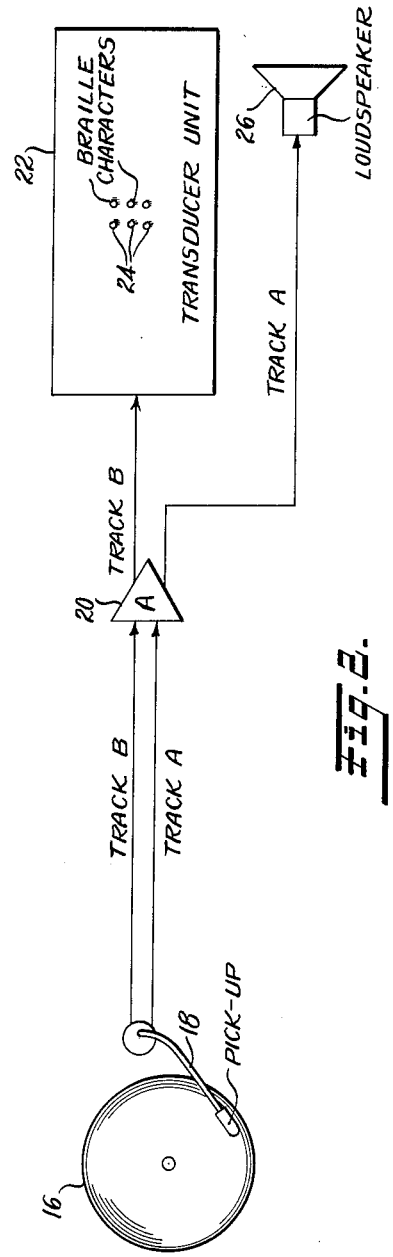
INVENTOR.
Carlos A. Irazoqui
BY
Bacon & Thomas
ATTORNEYS Jan. 25, 1966   C. A. IRAZOQUI   3,230,644
ELECTRONIC BRAILLE INSTRUCTOR
Filed June 29, 1961   3 Sheets-Sheet 2
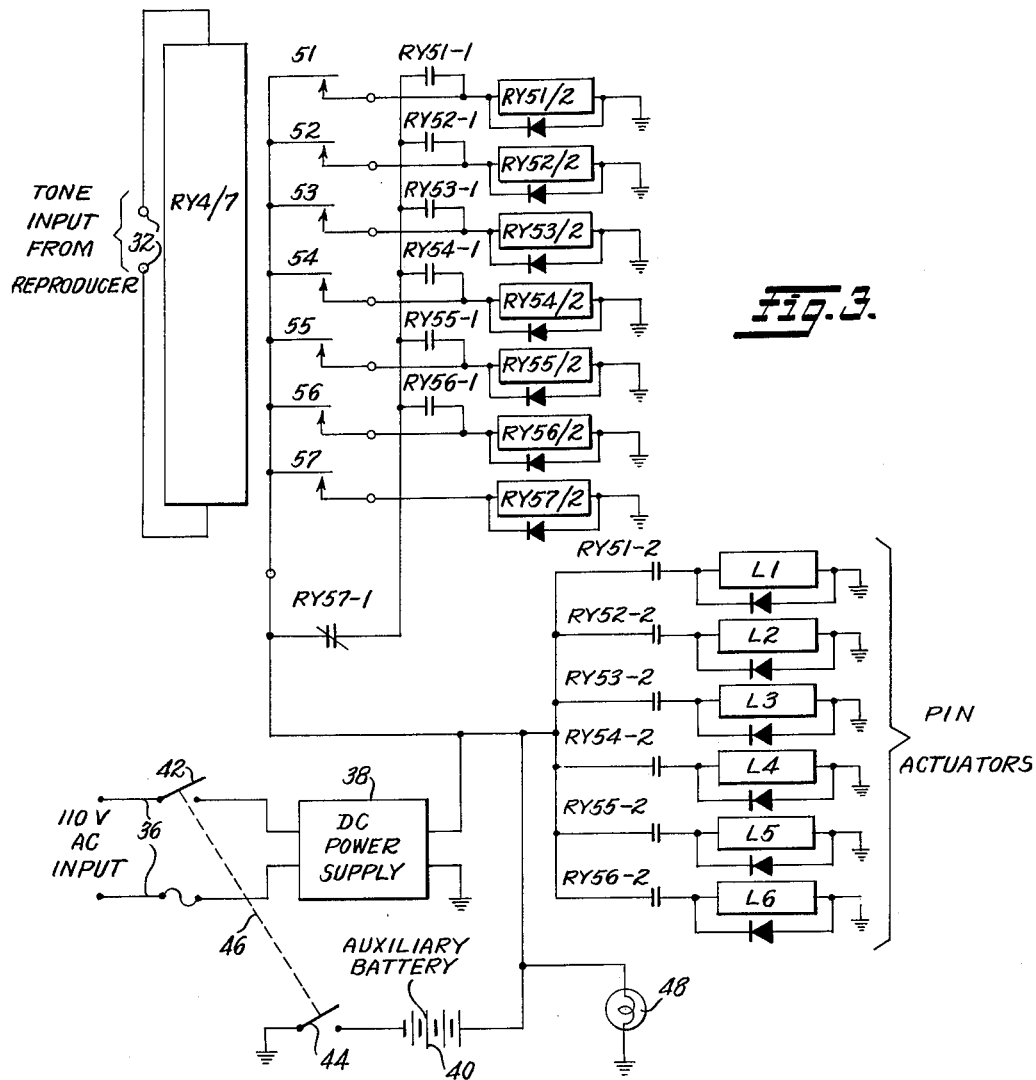
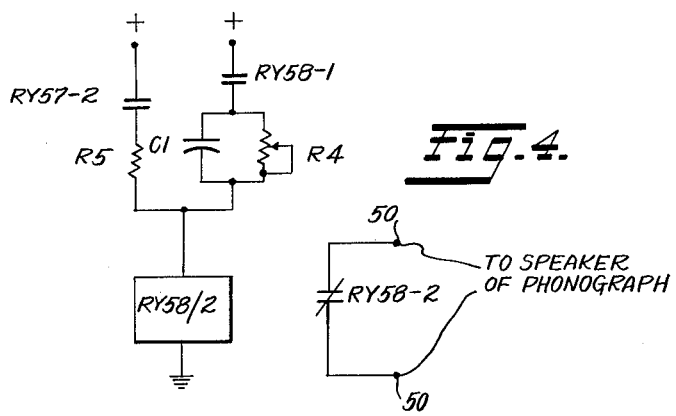
INVENTOR.
Carlos A. Irazoqui
BY
Bacon & Thomas
ATTORNEYS INVENTOR.
Carlos A. Irazoqui
BY
Bacon & Thomas
ATTORNEYS

United States Patent Office 3,230,644
Patented Jan. 25, 1966

3,230,644
ELECTRONIC BRAILLE INSTRUCTOR
Carlos A. Irazoqui, New York, N.Y., assignor to Electro-Mechanical Consultants, Inc., New York, N.Y., a corporation of New York
Filed June 29, 1961, Ser. No. 122,382
13 Claims. (Cl. 35—35)

This invention relates to a novel electronic instructor, and more specifically to a novel method of instructing Braille to the blind and to an electronic apparatus for performing the method.

Reading for blind people usually involves an application of the sense of touch. Various systems of reading have been devised, but the Braille system is most commonly used. This system involves the use of raised dots using six dots, three superimposed horizontal rows with two dots in a row. There are, therefore, six dot positions. The total number of combinations consisting of one, two, three, four, five and six dots is 63, which is more than the number of letters in the alphabet and numerals in the decimal system. However, the Braille system utilizes all 63 possible combinations for characters and abbreviations.

It is necessary, therefore, that a blind person receive the help of an instructor in learning the meaning of the 63 possible combinations of the six dots.

It is an object of the invention to provide a novel method to enable a person to learn and practice the reading of Braille without the necessity of constant attendance by an instructor.

It is a still further object to provide a novel method of encoding the various arrangements of dots employed in the Braille system and recording such information.

It is a still further object to provide a novel method of decoding a recorded encoding of the various arrangements of dots employed in the Braille system and in automatically operating a transducer unit to raise a series of pins to an elevated position corresponding with the raised dots in the Braille system for a particular recorded character.

It is a still further object to provide a novel method of encoding the various arrangements of dots employed in the Braille system and in simultaneously recording such coded information and the corresponding sound of the character being coded.

It is a still further object to provide a novel method of decoding a recorded encoding of the various arrangements of dots employed in the Braille system by simultaneously automatically operating a transducer unit to raise a series of pins to an elevated position corresponding with the raised dots in the Braille system for the particular recorded character and playing back the sound thereof.

It is a still further object to provide novel apparatus to perform the above methods.

In brief, the method involves the encoding of the operation of one or more of six keys, each key corresponding to a particular dot of the six-dot Braille system, to produce a different audio tone or electronic pulse sequence for each dot, which information is recorded on a magnetic tape or disk record together with the corresponding sound of the character being recorded. The encoding and sound may be recorded on separate tracks on a magnetic tape and transferred to a stereo record, or may be recorded directly on the stereo record. The information may also be recorded on a monaural record. The record is played back to energize a transducer unit which includes a series of pins arranged in the same formation as the Braille dots, and the pins are selectively operated to an elevated position, by signals from the record, where they can be sensed by a finger of the student, while, concurrently therewith, the corresponding sound is played back. Thus the student not only is permitted to feel the number and relative positions of the raised pins, which provide the same sense as dots on a page of printed Braille, but can hear the instructor's pronunciation of the character or word and any other pertinent information.

The manner of attainment of the above objects as well as other objects will become evident from a consideration of the following description in conjunction with the attached drawings, in which:

FIG. 1 is a diagrammatic representation of an encoder system and recorder;

FIG. 2 is a diagrammatic representation of a playback system including a transducer unit or decoder;

FIG. 3 is a schematic electrical circuit of the transducer unit;

FIG. 4 is a detail of the transducer circuit for a stereo recording;

Figure 5:
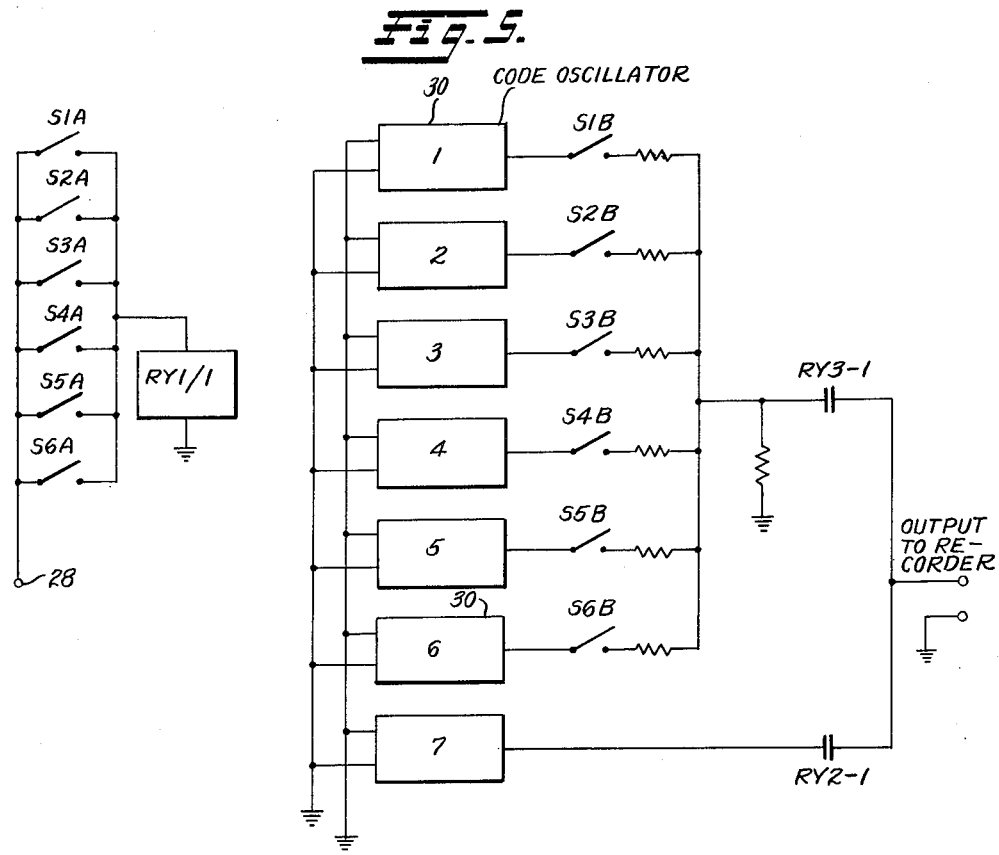
FIG. 5 is a schematic electrical circuit of the encoding and recording unit.
Figure 6:
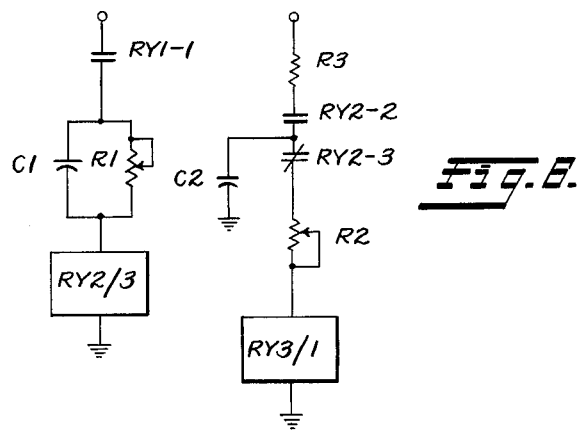
FIG. 6 is a detail of the transducer circuit as adapted for a monaural recording.

Referring to the drawings, in which the same reference character is used throughout to indicate the same element, FIG. 1 schematically illustrates a hook-up for encoding and recording Braille characters for use in instructing, and FIG. 2 schematically illustrates a hook-up for decoding the coded recorded information for teaching purposes. In the following description, the term "character" as applied to the Braille system, is used in a very broad sense, and may cover a letter, a numeral, an abbreviation, a word, or even a sentence.

The reference numeral 10 designates an encoder unit, having six pushbuttons 11 or the like numbered 1, 2, 3, 4, 5 and 6, corresponding with the six dots used to represent characters in the Braille system, although not shown as being arranged in the same pattern. The encoder unit 10 is connected with one track of a tape 13 of a dual track magnetic tape recorder 12, whereby coded information from the unit 10 may be recorded on one track of the tape. A microphone 14 is connected with the other track of the tape 13, whereby sounds picked up by the microphone may be simultaneously recorded on the magnetic tape together with the signals from the encoder unit.

The magnetic tape 13 may be used as a master record, to produce stereo records 16 for instruction purposes. If desired, however, the magnetic tape could be directly used for the same purpose.

Referring to FIG. 2, the record 16 is disposed on a playback device including a pickup arm 18 having two distinct pick-up needles or equivalent to pick up the recorded information on the two tracks of the stereo record and feed it, through an amplifier 20, to a transducer unit 22 and to a loudspeaker 26. The transducer unit 22 includes six pins 24 arranged in the same pattern as used in printed Braille system. The pins 24 are movably mounted within a housing with the upper ends thereof normally flush with or slightly below the plane of the table. Suitable means, such as a solenoid for each pin, are provided to elevate one or more of the pins in the manner of dots used in printed Braille, so that the student, by holding his or her finger over the pins, can feel the number and relative positions of those which are elevated.

In operation, the instructor presses the appropriate pushbuttons 11 in the encoder unit 10 corresponding with the character to be recorded, while, at the same time, voicing into the microphone 14 the sound of the character, which may or may not be accompanied by any other desired information. The encoder unit will encode the actuation of the six pushbuttons into six distinct and different signals, electrical or otherwise, which can be recorded. In the particular example shown, the information is converted into an electrical signal, which is recorded electromagnetically on one track on the tape 13 of the dual track tape recorder 12. The voice of the instructor is converted into an electrical signal and electromagnetically recorded on the other track of the tape recorder 12, and the recorded information may be transferred to the two tracks of a stereo record 16 for use by the student.

The student plays the record 16 in a suitable apparatus in which the information recorded in one track is fed by electrical signals to a loudspeaker 26, and the information in the other track is fed by other electrical signals to the transducer unit 22 for actuation of the pins 24 therein. The student holds a finger over the pins and is able to detect, by the sense of feel, the number of elevated pins and their relative positions while hearing, at the same time, the voice of the instructor from the loudspeaker giving the pronunciation or describing the character together with any other pertinent information. The pins 24 should have the same size and relative spacing of the dots used in printed Braille, and in this manner the student quickly becomes familiar with the characters used in the printed Braille alphabet.

FIGS. 3, 4, 5 and 6 illustrate diagrammatic electrical circuits of the multiple tone unit for use in the apparatus disclosed in FIGS. 1 and 2.

Referring to FIG. 5, current is supplied to the input 28. The switches S1A and S1B are connected with pushbutton 1 of the encoder unit 10 so that actuation of pushbutton 1 produces a concurrent closing of switches S1A and S1B. In like manner, switches S2A and S2B are connected with pushbutton 2; switches S3A and S3B are connected with pushbutton 3; switches S4A and S4B are connected with pushbutton 4; switches S5A and S5B are connected with pushbutton 5; and switches S6A and S6B are connected with pushbutton 6. The switches S1A, S2A, ... S6A are connected with a relay RY1/1 so that this relay is energized each time a pushbutton is depressed. The switches S1B, S2B, ... S6B are each connected in series with the output of a different frequency code oscillator 30, each of which is connected to the output when the respective switch in its circuit is closed.

When one or more of the switches S1A, S2A, ... S6A are operated, relay RY1/1 (FIG. 5) is energized, which energizes the relay RY2/3 through the closed contact RY1-1 (FIG. 6) and the network R1-C1. The adjustment of resistor R1 determines the time that RY2/3 will remain locked in.

While RY2/3 is in locked position, oscillator 7 will be connected to the output by closing of the contact RY2-1 to provide an output to the recorder, to provide a preliminary signal to reset the decoder. At this time capacitor C2 will charge up through closed contact RY2-2 and resistor R3, the contact RY2-3 being open. When relay RY2/3 drops out, capacitor C2 will energize relay RY3/1 through closed contact RY2-3 and resistor R2. The time that relay RY3/1 will be locked in depends on the adjustment of resistor R2.

During that time that relay RY3/1 is operated, the output from the code oscillators 30 may be fed to the recorder through appropriate code switches S1B, S2B, ... S6B and closed relay contact RY3-1. It is clear, therefore, that only those tones are fed to the recorder which correspond to the code switches S1B, S2B, ... S6B which are depressed at the time.

It is not necessary that all encoding switches be operated at precisely the same instant, since the code tones are not fed to the recorder until the output from the reset tone oscillator 7 has ended. The leeway permitted will be in the order of one-half a second.

Referring to FIG. 3, the output from the recorder is fed to the terminals of relay RY4/7 which operates with a series of resonant reeds 51, 52, 53, 54, 55, 56 and 57, respectively, each reed designed to respond only to a tone of a definite frequency at a minimum power level or to a tone within a definite band of frequencies at a higher power level. In addition, the circuit includes a power input 36 leading to a D.C. power supply 38, as well as an auxiliary battery 40 for use in areas where no electric power is otherwise available. The switches 42 for the A.C. power supply and the switch 44 for the auxiliary battery supply 40 are mechanically interconnected at 46 for simultaneous actuation. The circuit also includes an incandescent pilot lamp 48, the heat of which can be sensed by a blind student to indicate that the device is in operation.

When the pins of the transducer unit are to be actuated, a preliminary tone will be sent to the relay RY4/7 which will actuate reed 57, and through reed 57 will actuate auxiliary relay RY57/2. Actuation of auxiliary relay RY57/2 will open normally closed contact RY57-1 to interrupt the power supply to all other auxiliary relays RY51/2, RY52/2, ... RY56/2 and return the pins 24 to the depressed or lowered position. Following the preliminary tone, the input will consist of from one to six distinct tones, all recorded simultaneously. The presence of any one of these tones will serve to excite one or more of the associated reeds 51, 52, ... 56 and cause the actuation of the auxiliary relay and pin solenoids L1, L2, L3, L4, L5 and L6 associated with the reeds by closing appropriate contacts RY51-2, RY52-2, ... RY56-2. A holding circuit is established through the contacts RY51-1, RY52-1, ... RY56-1 when relay RY57/2 is deenergized and the contact RY57-1 closes, which retains the pin solenoids energized until another preliminary tone re-energizes auxiliary relay RY57/2. Thus 63 combination of dots can be generated by the use of between one and six tones, this number representing the entire Braille alphabet. The actuators may be integral with the auxiliary relays, avoiding the use of an extra device in each circuit.

In the above description, it is assumed that a stereo recording is employed, in which the voice of the instructor is recorded in one groove side and the actuating tones are recorded in the other groove side, and the cross talk between them is sufficiently small to render the tone signal inaudible to the student who might otherwise be tempted to identify the Braille character by the sound instead of by touch. This method has the advantage that the tone may be present while the instructor is speaking, which permits reading at the fastest rate which is particularly desirable for advanced students.

By incorporating an additional relay RY58/2 in the system, the device may be actuated by a monaural recording. The preliminary tone is present as in the previously described modification, but relay RY57 is fitted with an extra contact to energize relay RY58/2 (FIG. 4). Relay RY58/2 will keep itself locked through contact RY58-1 for a definite period of time which may be set by adjusting the value of resistance R4 and which will be sufficiently long to exceed the period during which the actuating tones are present. RY58-2 is interconnected with the speaker of the phonograph or other reproducer by the terminals 50 in such a manner that the speaker is temporarily disconnected while relay RY58/2 is energized, and hence the student will not hear the actuating tones.

It is evident that other modifications and arrangements will be obvious to a person skilled in the art, and it is therefore not intended that the above described preferred arrangements be considered as limitative, but that the scope of the invention is determined by the annexed claims.

I claim:

1. A method of instructing Braille, comprising: producing one or more coded electrical signals corresponding to one or more dots used for a particular Braille character and concurrently voicing the sound of said character by an instructor with or without accompanying comments; recording said coded signals and sound; playing back said recording to reproduce the sound and to concurrently operate a transducer unit having movable pins corresponding in number and arrangement with those used in the Braille system to elevate certain pins which correspond to the coded recorded character, whereby a student may feel the number and relative position of the elevated pins while hearing the instructor's sound.

2. A method of instructing Braille, comprising: producing a distinct audio frequency electrical signal for each dot in the Braille system used in representing a character; recording said signals and thereafter reproducing said signals and causing the same to operate a transducer unit having movable pins corresponding in number and arrangement with those used in the Braille system to elevate certain pins which correspond with the recorded character, whereby a student may feel the number and the relative positions of the elevated pins, and an instructor's voicing and recording of the sound of the character concurrently with the production and recording of the signals, and the playback of the recorded sound concurrently with the reproduction of the signals.

3. A method of instructing Braille, comprising: producing a distinct audio frequency electrical signal for each dot in the Braille system used to represent a character; recording said signals in one groove side of a stereo recording; simultaneously voicing the sound of the character by an instructor and recording said sound in the other groove side; playing back said recorded signals and causing the same to operate a transducer unit having movable pins corresponding in number and arrangement with those used in the Braille system to elevate certain pins which correspond with the recorded character, and simultaneously playing back the recorded sound, whereby a student may feel the number and the relative positions of the elevated pins while hearing the instructor's voice.

4. A method of instructing Braille, comprising: producing a distinct electronic signal for each dot in the Braille system used in representing a character; simultaneously voicing the sound of said character by an instructor and converting it into an electrical signal; recording said character signal and sound signal; playing back said recording to operate, by said character signals, a transducer unit having movable pins corresponding in number and arrangement with those used in the Braille system, to elevate certain pins which correspond with the recorded character, while simultaneously converting the sound signal to an audible sound, whereby a student may feel the number and relative positions of the elevated pins and hear the instructor's voice.

5. A method of learning Braille, comprising: playing back a recording having thereon a first signal comprising coded information to operate a transducer unit having movable pins corresponding in number and arrangement with those used in the Braille system to elevate certain pins corresponding with the recorded coded character, and having thereon a second signal which produces an instructor's voice producing a sound corresponding with that of the recorded character, whereby a student may feel the number and the relative positioning of the elevated pins and hear the instructor's voice.

6. An electronic apparatus for instructing Braille, comprising: an encoder unit, including separate means to produce a distinct electronic signal for each of the six dots in the Braille system; a recording means, connected with said encoder unit, for recording such electronic signals on a record means; a record playback means; and a transducer unit connected with said playback means, said transducer unit having a series of pins corresponding in number and arrangement with the dots used in the Braille system, certain of said pins, corresponding with the recorded signals, being raised to correspond with a recorded character, whereby the student may feel the number and arrangement of the raised pins, a microphone connected with said recording means to simultaneously produce a record of the sound voiced by an instructor corresponding with the character being encoded by the encoder unit on said same record means, and a speaker, connected with said playback means, to reproduce the instructor's sound concurrently with the operation of the transducer unit.

7. An electronic apparatus for instructing Braille, comprising: an encoder unit, including separate means to produce a distinct electronic signal for each of the six dots in the Braille system; a recording means, connected with said encoder unit, for recording such electronic signals on a record means; a record playback means; and a transducer unit connected with said playback means, said transducer unit having a series of pins corresponding in number and arrangement with the dots used in the Braille system, certain of said pins, corresponding with the recorded signals, being raised to correspond with a recorded character, whereby the student may feel the number and arrangement of the raised pins, said encoder unit including means to produce a different audio frequency signal for each of the six dots.

8. An electronic apparatus for instructing Braille, comprising: an encoder unit, including separate means to produce a distinct electronic signal for each of the six dots in the Braille system; a recording means, connected with said encoder unit, for recording such electronic signals on a record means; a record playback means; and a transducer unit connected with said playback means, said transducer unit having a series of pins corresponding in number and arrangement with the dots used in the Braille system, certain of said pins, corresponding with the recorded signals, being raised to correspond with a recorded character, whereby the student may feel the number and arrangement of the raised pins, said encoder unit including means to produce a different audio frequency signal for each of the six dots, and in which said transducer unit includes a plurality of reeds, each reed vibrating to a different frequency and connected to actuate one of said pins.

9. An electronic apparatus for instructing Braille, comprising: an encoder unit, including separate means to produce a distinct electronic signal for each of the six dots in the Braille system; a recording means, connected with said encoder unit, for recording such electronic signals on a record means; a record playback means; and a transducer unit connected with said playback means, said transducer unit having a series of pins corresponding in number and arrangement with the dots used in the Braille system, certain of said pins, corresponding with the recorded signals, being raised to correspond with a recorded character, whereby the student may feel the number and arrangement of the raised pins, a microphone connected with said recording means to simultaneously produce a record of the sound voiced by an instructor corresponding with the character being encoded by the encoder unit, a speaker, connected with said playback means, to reproduce the instructor's sound concurrently with the operation of the transducer unit, and in which said recording means includes a pair of recording tracks, the electronic character signals being recorded on one track and the instructor's voice being recorded on the other track.

10. An electronic apparatus for instructing Braille, comprising: an encoder unit, including separate means to produce a distinct electronic signal for each of the six dots in the Braille system; a recording means, connected with said encoder unit, for recording such electronic signals on a record means; a record playback means; and a transducer unit connected with said playback means, said transducer unit having a series of pins corresponding in number and arrangement with the dots used in the Braille system, certain of said pins, corresponding with the recorded signals, being raised to correspond with a recorded character, whereby the student may feel the number and arrangement of the raised pins, the electrical circuit of the transducer unit including means, responsive to a recorded signal prior to each operation of the transducer unit, to lower all pins to their lowermost position.

11. An electronic apparatus for recording Braille, comprising: an encoder unit, said unit having six pushbuttons, a different button corresponding with each dot in the Braille system, a distinct electronic signal generating means connected with each pushbutton, and recording means connected with said encoder unit to record said electronic signals, a microphone into which an instructor voices sounds corresponding with the characters encoded by the encoder unit simultaneously with the encoding of the character, said microphone being connected with said recording means, whereby said sounds are simultaneously recorded with said electronic character signals.

12. An electronic Braille instructing apparatus, comprising: playback means; a transducer unit connected with said playback means, said transducer unit including six means, each of said latter means being energized responsive to a different signal produced by a record adapted to be reproduced by the playback means, and six movable pins arranged in a pattern corresponding with Braille dots and normally in a first low position, and means connecting each of said pins with a different one of said signal responsive means to elevate one or more of the pins to a higher position in response to energization of its connected signal responsive means, an additional signal responsive means connected with said movable pins and operable, in response to a preliminary signal produced by a record on the playback means, to release the elevated pins and to return them to their retracted position prior to energization of said six means.

13. An electronic Braille instructing apparatus, comprising: playback means; a transducer unit connected with said playback means, said transducer unit including six means, each of said latter means being energized responsive to a different signal produced by a record adapted to be reproduced by the playback means, and six movable pins arranged in a pattern corresponding with Braille dots and normally in a first low position, and means connecting each of said pins with a different one of said signal responsive means to elevate one or more of the pins to a higher position in response to energization of its connected signal responsive means, said means, responsive to different signals, comprising vibrating reeds.

References Cited by the Examiner
UNITED STATES PATENTS

| | | | |
|---|---|---|---|
| 2,549,632 | 4/1951 | Nottingham | 35—31 |
| 2,777,901 | 1/1957 | Dostert | 35—35 |
| 2,907,833 | 10/1959 | Mauch | 35—35.1 |
| 2,924,896 | 2/1960 | Kelly | 35—31 |
| 2,972,140 | 2/1961 | Hirsch | 35—35.1 X |

EUGENE R. CAPOZIO, *Primary Examiner.*

LEO SMILOW, GEORGE NINAS, Jr., JEROME SCHNALL, *Examiners.*